US012099363B2

(12) United States Patent
Cave

(10) Patent No.: US 12,099,363 B2
(45) Date of Patent: Sep. 24, 2024

(54) AUTONOMOUS DRIVING SYSTEM EMERGENCY SIGNALING

(71) Applicant: Tesla, Inc., Austin, TX (US)

(72) Inventor: Michael D. Cave, Austin, TX (US)

(73) Assignee: Tesla, Inc., Austin, TX (US)

(*) Notice: Subject to any disclaimer, the term of this patent is extended or adjusted under 35 U.S.C. 154(b) by 0 days.

(21) Appl. No.: 18/332,224

(22) Filed: Jun. 9, 2023

(65) Prior Publication Data

US 2024/0085915 A1 Mar. 14, 2024

Related U.S. Application Data

(63) Continuation of application No. 17/092,845, filed on Nov. 9, 2020, now Pat. No. 11,675,358, which is a continuation of application No. 16/142,856, filed on Sep. 26, 2018, now Pat. No. 10,831,206.

(60) Provisional application No. 62/583,170, filed on Nov. 8, 2017.

(51) Int. Cl.
*G05D 1/00* (2024.01)
*B60Q 9/00* (2006.01)
*G06N 3/08* (2023.01)
*H04J 3/00* (2006.01)
*H04J 3/16* (2006.01)

(52) U.S. Cl.
CPC ............ *G05D 1/0214* (2013.01); *B60Q 9/00* (2013.01); *G05D 1/0268* (2013.01); *H04J 3/00* (2013.01); *H04J 3/1682* (2013.01); *G05D 1/0088* (2013.01); *G06N 3/08* (2013.01)

(58) Field of Classification Search
CPC .. G05D 1/0214; G05D 1/0268; G05D 1/0088; B60Q 9/00; H04J 3/00; H04J 3/1682; G06N 3/08
See application file for complete search history.

(56) References Cited

U.S. PATENT DOCUMENTS

| 5,257,190 | A | 10/1993 | Crane | |
|---|---|---|---|---|
| 6,338,010 | B1* | 1/2002 | Sparks | B60R 16/0315 340/459 |
| 6,958,707 | B1 | 10/2005 | Siegel | |
| 10,831,206 | B2* | 11/2020 | Cave | B60Q 9/00 |
| 2008/0306647 | A1 | 12/2008 | Jeon et al. | |
| 2017/0088072 | A1* | 3/2017 | Curtis | G08B 31/00 |
| 2017/0338835 | A1 | 11/2017 | Priller et al. | |
| 2018/0124584 | A1 | 5/2018 | Venkatraman et al. | |

* cited by examiner

*Primary Examiner* — Aaron L Troost
(74) *Attorney, Agent, or Firm* — FOLEY & LARDNER LLP

(57) ABSTRACT

A vehicular autonomous driving system includes a time division multiplexed (TDM) bus, an autonomous driving (AD) controller coupled to the TDM bus, and a plurality of AD sensors coupled to the TDM bus. The AD sensors are configured to collect AD data and transmit collected AD data to the AD controller on the TDM bus in an assigned time slot at a first power level. A first AD sensor of the plurality of AD sensors is configured to, based upon collected AD data, detect an AD emergency event. In response to the detection, the first AD sensor is configured to transmit an AD emergency message on the TDM bus in a non-assigned time slot and at a second power level that exceeds the first power level. The AD sensor may transmit the AD emergency message in a particular sub-slot of the non-assigned time slot.

18 Claims, 16 Drawing Sheets

AUTONOMOUS DRIVING SYSTEM EMERGENCY SIGNALING

INCORPORATION BY REFERENCE TO ANY PRIORITY APPLICATIONS

The present application claims priority pursuant to 35 U.S.C. 119(e) to U.S. Provisional Patent Application No. 62/583,170, entitled "AUTONOMOUS DRIVING SYSTEM EMERGENCY SIGNALING", filed 8 Nov. 2017, which is incorporated herein by reference in its entirety for all purposes.

BACKGROUND OF THE INVENTION

Field of the Invention

The present invention relates to the autonomous driving of a vehicle; and more particularly to the communication of autonomous driving data within the vehicle.

Description of the Related Art

Self-driving vehicles are generally known to include a plurality of sensors, e.g., RADAR sensors, and LIDOR sensors, cameras, and sonic proximity detectors, among other types of data capturing components. The data captured by these sensors is communicated to a central processor, which processes the data to assist in making autonomous driving decisions, e.g., braking, accelerating, steering changes, etc. Such autonomous driving decisions may be performed while the vehicle is self-driving or when the driver of the vehicle is being assisted, e.g., emergency braking, driver notification, etc.

Some or all of the sensors continuously capture data while the vehicle is operating. This data may be initially processed by a sensor to determine whether immediate action is required, e.g., RADAR sensor sensing rapidly decreasing distance between the vehicle and another object. Due to the importance of communicating this initial determination to the central processor, the sensor making such determination must communicate with the central processor with minimal latency. However, in most autonomous driving systems, data is transmitted from the sensors to the central processor via a shared bus, e.g., Time Division Multiplexed bus. Thus, a sensor that makes an initial determination that immediate action is required must wait until its designated access time to the shared bus. Delay resulting from waiting to communicate from a sensor to the central processor may result in a collision.

SUMMARY OF THE INVENTION

DETAILED DESCRIPTION OF THE PREFERRED EMBODIMENT

Figure 1:
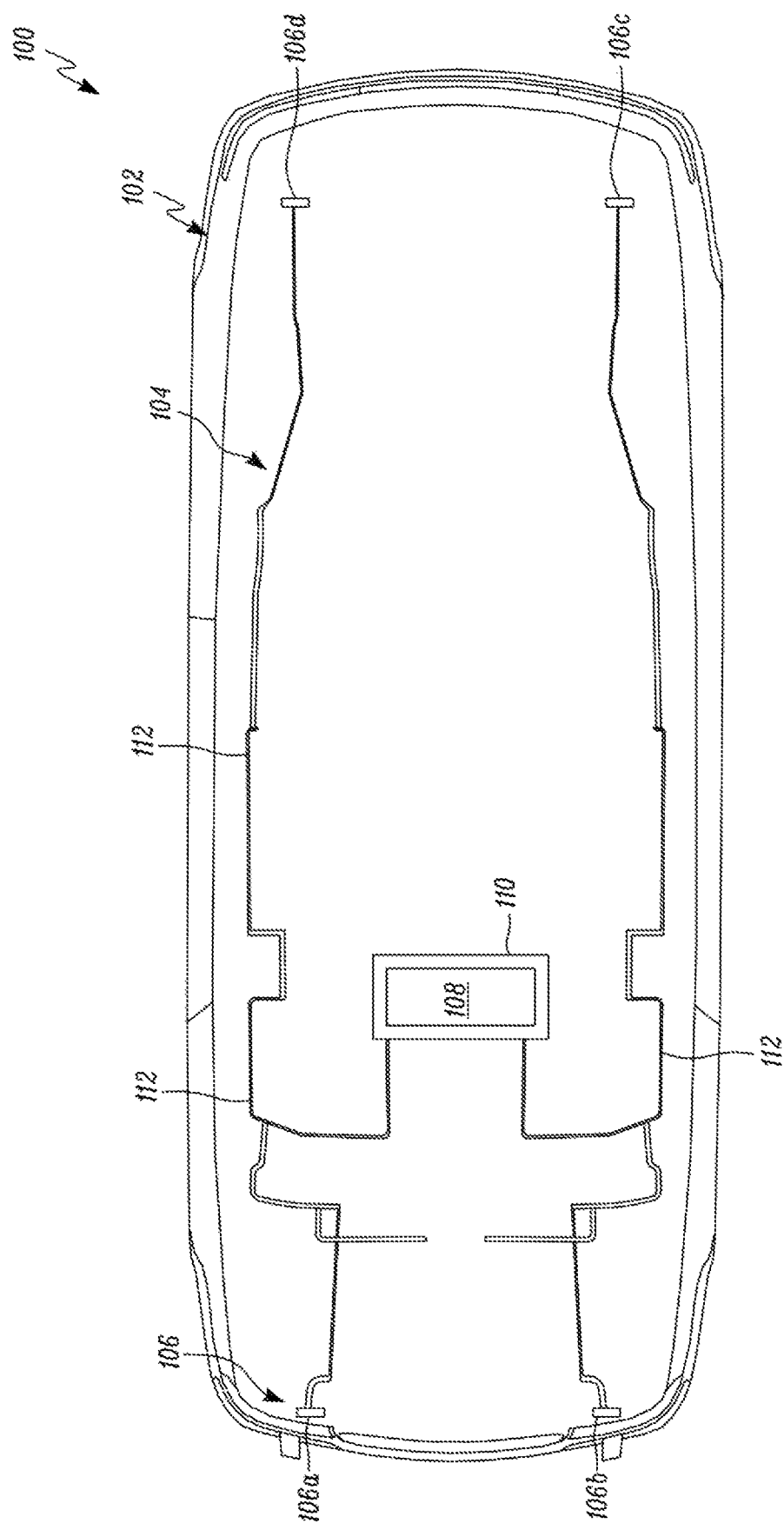
FIG. 1 is a diagram illustrating a vehicle having a vehicular autonomous driving system constructed and operating according to a described embodiment.

FIG. 1 is a diagram illustrating a vehicle having a vehicular autonomous driving system constructed and operating according to a described embodiment. An automobile 100 that includes the vehicular autonomous driving system has a body 102 and a wiring system 104 for connecting a plurality of autonomous driving sensors 106a-106d to an autonomous driving controller 108. The wiring system 104 of FIG. 1 is a structural cable 112. The autonomous driving controller 108 may reside on or in or be co-located with an infotainment device 110. The infotainment device 110 may be used to control functions of various components present in the automobile 100, e.g., to take over control of a steering function associated with a steering system (not shown) of the automobile 100, a braking function, an acceleration function, or another function of the automobile 100 related to autonomous driving or collision prevention. These operations of the infotainment device 110 are performed based upon interaction with the autonomous driving controller 108.

Figure 2:
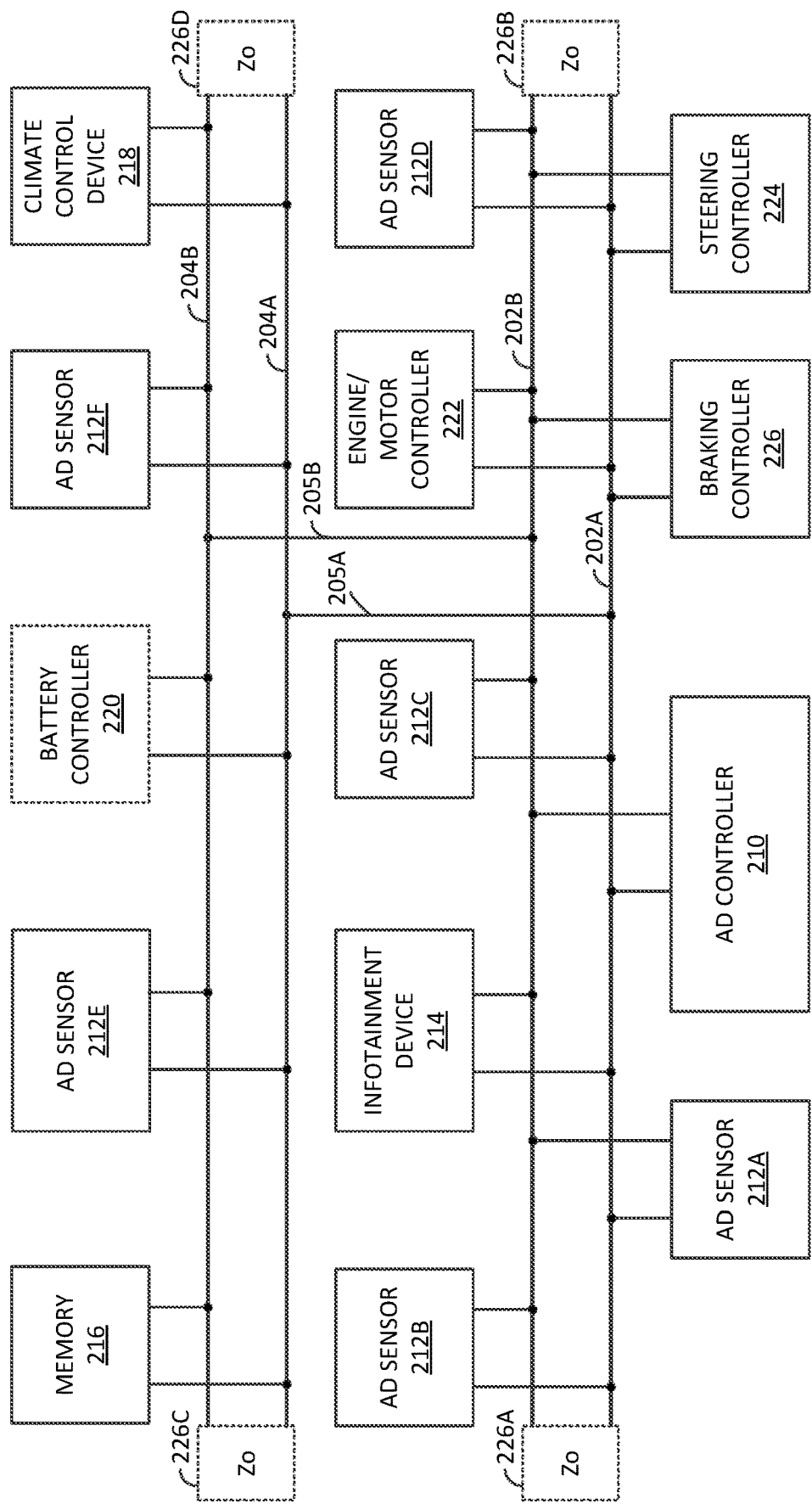
FIG. 2 is a block diagram illustrating a vehicular autonomous driving system constructed and operating according to a first described embodiment.
Figure 3:
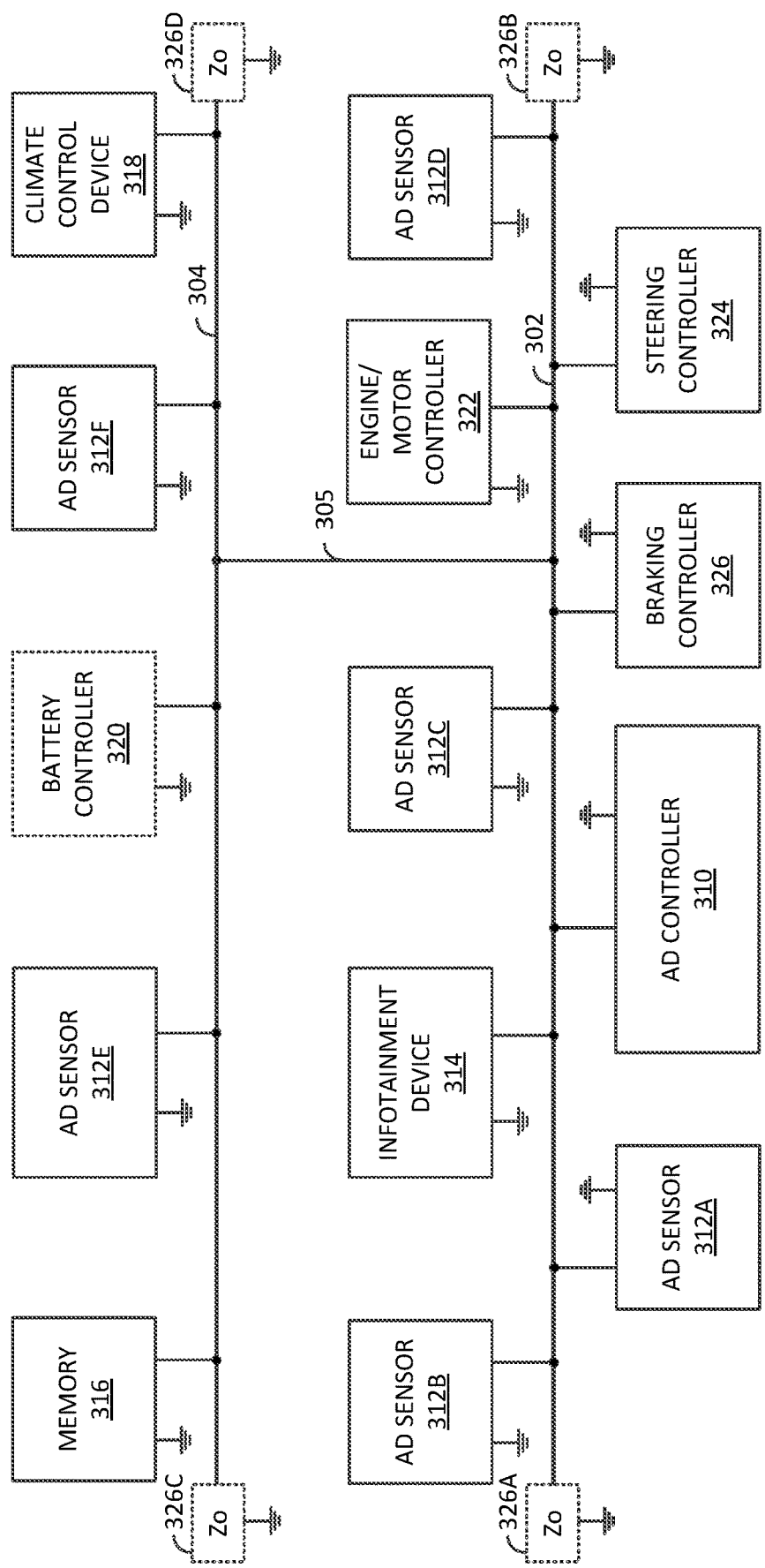
FIG. 3 is a block diagram illustrating a vehicular autonomous driving system constructed and operating according to a second described embodiment.

The autonomous driving sensors 106a-106d include cameras, RADAR sensors, LIDAR sensors, sonic proximity sensors, or other sensors that collect information relevant to the operation of the automobile 100. For example, autonomous driving sensors 106a, 106b could be cameras while autonomous driving sensors 106c, 106d could be RADAR sensors. The autonomous driving sensors 106a-106d are communicatively connected to the autonomous driving controller 108 via the structural cable 112. The structural cable 112 may include a single conductor or a pair of conductors and may be twisted pair wiring, coaxial wiring, single conductor wiring, a power bus or wiring, strip wiring, or other wiring. When the structural cable 112 includes two or more conductors, as is illustrated in FIG. 2, communications supported by the structural cable 112 may be differential, which causes the communications to be more resistance to noise generated within the automobile 100. When the structural cable 112 includes only a single conductor, as is illustrated in FIG. 3, communications supported by the structural cable 112 are single ended with the chassis of the automobile 100 serving as a common ground.

According to a number of embodiments described herein, the autonomous driving sensors 106a, 106b, 106c, and 106d (and other components coupled to the structural cable 112) communicate with the autonomous driving controller 108 in a Time Division Multiplexed (TDM) fashion, i.e., each autonomous driving sensor 106a-106d or other device coupled to the structural cable has access to the structural cable 112 during respective assigned time slots. The terms "structural cable" and "TDM bus" are both used herein to describe one or more communication paths that communicatively intercouple communication devices within the automobile 100. Further, the terms "TDM bus time slot" and "time slot" will be used interchangeably herein. The teachings presented herein may also be applied to differing vehicles as well, e.g., boats, trucks, etc. that support autonomous driving.

The communications serviced within the automobile 100 via the structural cable 112 may operate consistently with a broadband Power Line Communication (PLC) operating standard as modified according to the present disclosure. Broadband PLC operating standards typically specify carrier frequencies of 1.8-250 MHz and support relatively high data rates up to hundreds of Mbps. Specifications for PLC include the Universal Powerline Association, SiConnect, the HD-PLC Alliance, Xsilon and the ITU-T's G.hn specifications. Other specifications, including the HomePlug AV and IEEE 1901 standards specify how data is supported. PLCs are designed to be robust in noisy environments. Vehicles, particularly electric vehicles, include components that create noise. The PLCs are wells suited to broadband communications within an automobile, considering their accommodation for noise on servicing conductor(s).

FIG. 2 is a block diagram illustrating a vehicular autonomous driving system 200 constructed and operating according to a described embodiment. The vehicular autonomous driving system 200 includes a TDM bus, an autonomous driving controller 210 coupled to the TDM bus, and a plurality of autonomous driving sensors 212A-212F coupled to the TDM bus. In the embodiment of FIG. 2, the TDM bus includes two interconnected sections. A first section of the TDM bus includes conductors 202A and 202B that are terminated via terminations 226A and 226B to minimize reflections. A second section of the TDM bus includes conductors 204A and 204B that are terminated via terminations 226C and 226D to minimize reflections. Interconnecting conductors 205A and 205B intercouple the first and second sections of the TDM bus. The TDM bus may be a twisted pair of conductors, a pair of strip conductors, a coaxial conductor, a two conductor power bus that carries DC power, or another structure having two conductors to support TDM communications.

A plurality of devices communicates via the TDM bus. These devices include the autonomous driving controller 210, the plurality of autonomous driving sensors 212A-212F, an infotainment device 214, memory 216, a climate control device 218, a battery controller 220 (when the vehicle is an electric vehicle or hybrid vehicle), an engine/motor controller 222, a steering controller 224, and a braking controller 226. Note that the communication connectivity via the TDM bus may be different in differing embodiments.

The plurality of autonomous driving sensors 212A-212F may include one or more RADAR units, one or more LIDAR units, one or more cameras, and/or one or more proximity sensors. The plurality of autonomous driving sensors 212A-212F collect autonomous driving data and transmit the collected autonomous driving data to the autonomous driving controller 210 on the TDM bus in assigned time slots at a first power level. A first autonomous driving sensor e.g., autonomous driving sensor 212A, of the plurality of autonomous driving sensors 212A-212F is configured to, based upon collected autonomous driving data, detect an autonomous driving emergency event, e.g., potential collision, determination that collected data is not trustworthy, determination that communications on the TDM bus are compromised (lost/corrupt data/loss of TDM link, etc.) or that another event has been detected that should cause the autonomous driving system 200 to alter its operations. The autonomous driving sensor 212A, in response to a detected autonomous driving emergency event, transmits an autonomous driving emergency message on the TDM bus in a non-assigned time slot and at a second power level that exceeds the first power level.

For example, the autonomous driving sensor 212A may be a camera that collects images and pre-processes the images to determine a relative difference between the images. When the differences between the images is significant (to potentially indicate a collision), the autonomous driving sensor 212A may detect an autonomous driving emergency event. Similarly, the autonomous driving sensor 212E may be a RADAR unit that detects the position(s) of other objects. When a distance to a detected object changes at a rate that exceeds a threshold the autonomous driving sensor 212E may detect an autonomous driving emergency event.

When an autonomous driving emergency event is detected by an autonomous driving sensor 212A-202E, the detection must be communicated as soon as possible to the autonomous driving controller 210. Thus, according to the present disclosure, an autonomous driving sensor, e.g., autonomous driving sensor 212A, that detects the autonomous driving emergency event transmits the autonomous driving emergency message in a non-assigned time slot at a higher transmit power level than a transmit power level of an autonomous driving sensor, e.g., autonomous driving sensor 212D, that is assigned the time slot. Because the autonomous driving emergency message is transmitted at a higher power level than the transmission from the autonomous driving sensor 212D, the transmission from the autonomous driving sensor 212D may be treated as background noise by the autonomous driving controller 210 to thereby receive and decode of the autonomous driving emergency message.

According to one aspect of the vehicular autonomous driving system 200 of FIG. 2, the collected autonomous driving data is transmitted on the TDM bus using a first modulation and the autonomous driving emergency message is transmitted using a second modulation that differs from the first modulation. The first modulation may be a higher order Quadrature Amplitude Modulation (QAM), which services a high data rate between the autonomous driving sensors 212A-212F and the autonomous driving controller 210. The autonomous driving emergency message may be transmitted with a simpler modulation, e.g., Binary Phase Shift Keying (BPSK) modulation, which supports demodulation and decoding at the autonomous driving controller 210 with a higher likelihood of success, i.e., the autonomous driving emergency message is more robust at a lower order of modulation.

According to another aspect of the present disclosure, the second power level is 6 dB greater than the first power level. In some systems in which the described embodiments are implemented, the Peak to Average Power Ratio (PAR) of the signal is approximately 15 dB for a targeted Bit Error Rate (BER). Thus, there is sufficient headroom to tolerate the second power level that has a 6 dB increase in signal power while using a lower modulation scheme (such as BPSK) which will not saturate any receive signal path components. However, this difference in signal power may be greater or lesser than 6 dB. The difference in signal level must be sufficient to allow the autonomous driving controller 210 and other autonomous driving sensors 212B-212 to successfully demodulate and decode the autonomous driving emergency message even though autonomous driving data is concurrently transmitted on the TDM bus. Such discrepancy of transmit power level causes the Signal to Noise Ratio (SNR) of the autonomous driving emergency message to be much greater than the SNR of another transmission on the TDM bus.

According to another aspect of the present disclosure, one or more second autonomous driving sensors of the plurality of autonomous driving sensors are configured to detect the autonomous driving emergency message on the TDM bus. In response thereto, the one or more second autonomous driving sensors temporarily cease transmissions on the TDM bus to allow the autonomous driving sensor that transmitted the autonomous driving emergency message to transmit its autonomous driving data to the autonomous driving controller 210. Ceasing of communications may continue until the autonomous driving controller 210 directs the one or more second autonomous driving sensors to resume communications.

According to yet another aspect, the first autonomous driving sensor of the plurality of autonomous driving sensors transmits the autonomous driving emergency message on the TDM bus in a predetermined sub-time slot of the non-assigned time slot at the second power level, the predetermined sub-time slot identifying the first autonomous driving sensor of the plurality of autonomous driving sensors. Further, according to yet a further aspect, the autonomous driving controller may be configured to reassign time slots on the TDM bus after its detection of the emergency message. These aspects will be described in detail with reference to FIGS. 9A-9C.

FIG. 3 is a block diagram illustrating a vehicular autonomous driving system 300 constructed and operating according to a described embodiment. As compared to the embodiment of FIG. 2, the TDM bus of FIG. 3 includes two segments, each including a single conductor 302 and 304 intercoupled by another single conductor 305. Terminating impedances 326A and 326B may terminate single conductor 302 while terminating impedances 326C and 326D may terminate single conductor 304.

A plurality of devices communicates via the TDM bus, such devices including an autonomous driving controller 310, a plurality of autonomous driving sensors 312A-212F, an infotainment device 314, memory 316, a climate control device 318, a battery controller 320 (when the vehicle is an electric vehicle or hybrid vehicle), an engine/motor controller 322, a steering controller 324, and a braking controller 326. These devices each support single ended communications via the TDM bus. The components of the vehicular autonomous driving system 300 of FIG. 3 operate similarly to the components of the vehicular autonomous driving system 200 of FIG. 2 but, instead, using single ended signaling instead of differential signaling. The chassis of the automobile or another common connection serves as a common ground, to which each of the devices coupled to the TDM bus also connect. Single ended signaling is used with the vehicular autonomous driving system 300 of FIG. 3 as compared to differential signaling used with the vehicular autonomous driving system 200 of FIG. 2.

Figure 4B:
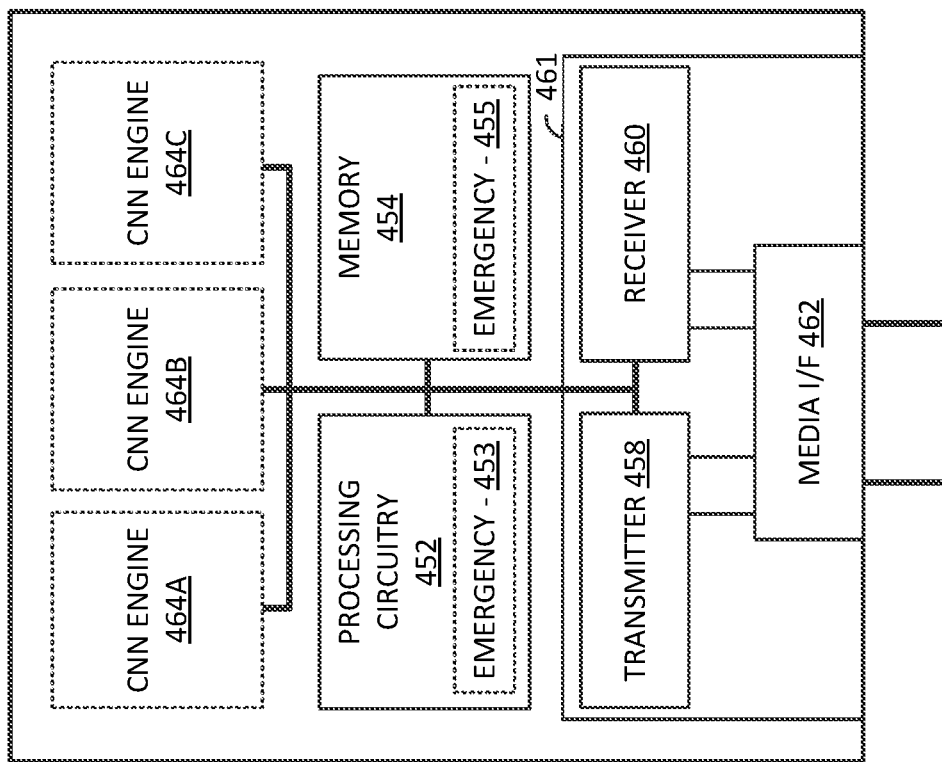
FIG. 4B is a block diagram illustrating an autonomous driving controller constructed according to a described embodiment.
Figure 4A:
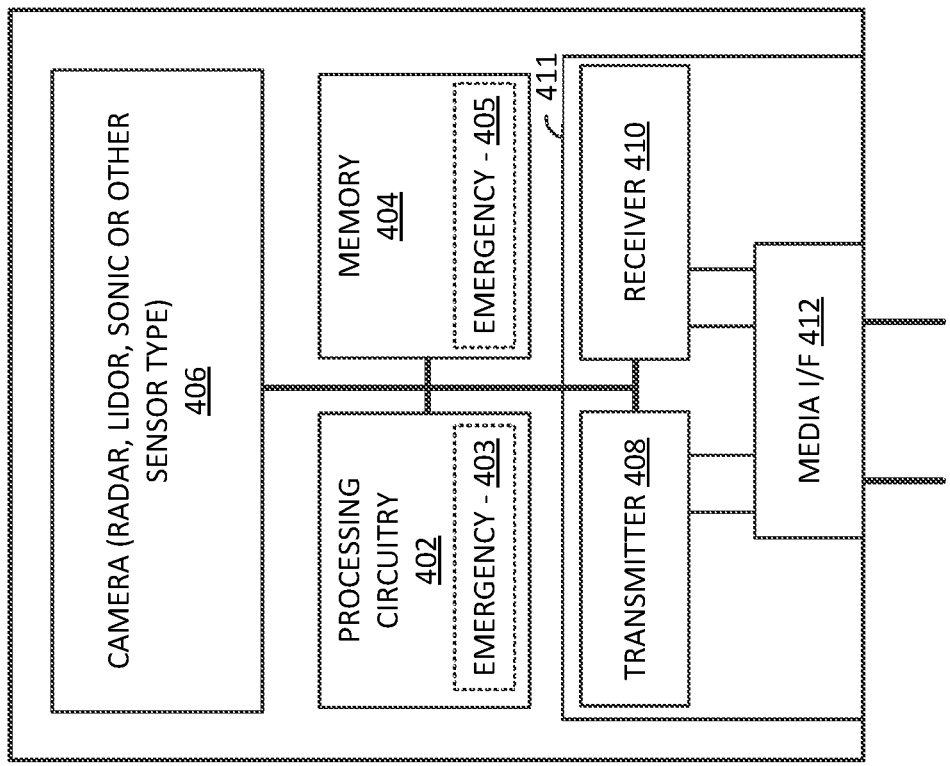
FIG. 4A is a block diagram illustrating an autonomous driving sensor constructed according to a described embodiment.

FIG. 4A is a block diagram illustrating an autonomous driving sensor constructed according to a described embodiment. The autonomous driving sensor 312 includes a data collection component 406 configured to collect autonomous driving data. The data collection component 406 may be a RADAR sensor, a LIDAR sensor, a sonic proximity sensor, or another type of sensor. The autonomous driving sensor 312 further includes processing circuitry 402, memory 404, and a transceiver 411 coupled to the processing circuitry 402, to the memory 404, and to the data collection component 406 via a bus. The processing circuitry 402 executes programs stored in memory 404, e.g., autonomous driving emergency operations 403, reads and writes data from/to memory 404, e.g., data and instructions 405 to support autonomous driving emergency operations, interacts with the data collection component 406 to control the collection of autonomous driving data, processes the autonomous driving data, and interacts with the transceiver 411 to communicate via the TDM bus, among other operations.

By way of example and not limitation, processing circuitry 402 may be a central processing unit, a microcontroller, a digital signal processor, an application specific integrated circuit, a Judging unit, a Determining Unit, an Executing unit, combinations of any of the foregoing, or any other device suitable for execution of computer programs. By way of example, memory 404 may be dynamic memory, static memory, disk drive(s), flash drive(s), combinations of any of the foregoing, or any other form of computer memory. The memory 404 stores computer programs for operations of the present disclosure, may also store other computer programs, configuration information, and other short-term and long-term data necessary for implementation of the embodiments of the present disclosure.

The transceiver 411 includes a transmitter 408, a receiver 410, and a media I/F 412. The media I/F 412 may be a transmit/receive (T/R) switch, a duplexer, or other device that supports the illustrated coupling. In other embodiments, both the transmitter 408 and receiver 410 couple directly to the TDM bus or couple to the TDM bus other than via the media I/F 412.

The transceiver 411 will be described in more detail with reference to FIG. 5 and supports communications via the TDM bus. The processing circuitry 402 and the transceiver 411 are configured to transmit first autonomous driving data to the autonomous driving controller on the TDM bus in at least one assigned time slot at a first power level. The processing circuitry 402 is also configured to detect an autonomous driving emergency event based upon at least second collected autonomous driving data. In response to the detected autonomous driving emergency event, the processing circuitry 402 and the transceiver 411 are configured to transmit an autonomous driving emergency message on the TDM bus in a non-assigned time slot and at a second power level that exceeds the first power level. Examples of these operations will be described with reference to FIGS. 7-9E. The operations of the autonomous driving sensor 312 will be described in more detail with reference to FIG. 10.

The first autonomous driving data may be transmitted using a first modulation and the autonomous driving emergency message may be transmitted using a second modulation that differs from the first modulation. Further, the second power level may be 6 dB greater than the first power level. The processing circuitry 402 and the transceiver 411 may be further configured to detect an autonomous driving emergency message on the TDM bus transmitted by a differing autonomous driving sensor and temporarily cease transmissions on the TDM bus. Additionally, the processing circuitry 402 and the transceiver 411 may further transmit the autonomous driving emergency message on the TDM bus in a predetermined sub-time slot of the non-assigned time slot at the second power level, the predetermined sub-time slot identifying the first autonomous driving sensor of the plurality of autonomous driving sensors.

FIG. 4B is a block diagram illustrating an autonomous driving controller constructed according to a described embodiment. The autonomous driving controller 310 includes processing circuitry 452, memory 454, and a transceiver 461 coupled to the processing circuitry 452 and configured to communicate with a plurality of autonomous driving sensors via the TDM bus. The autonomous driving controller 310 may also include a plurality of Convolutional Neural Network (CNN) engines 464A, 464B, and 464C that are configured to operate on autonomous driving data received from the autonomous driving sensors. Differing Neural Networks and/or differing processing systems may be employed consistently with the embodiments of the present disclosure. The processing circuitry 452 is configured to perform autonomous driving functions and other vehicle control functions based upon the autonomous driving data, other data, and programmed operations. The transceiver 461 includes a transmitter 458, a receiver 460, and a media OF 462 that in combination support communications via the TDM bus.

The construct of the processing circuitry 452 may be similar to the construct of the processing circuitry 402 of the autonomous driving sensor 312 but with additional processing power to service the requirements of the autonomous driving controller 310. For example, the processing circuitry 402 may include a plurality of individual processors that operate in parallel. The memory 454 may be of similar structure as the memory 404 of the autonomous driving sensor 312 but with capacity as required to support the functions of the autonomous driving controller 310.

In one aspect of operations of the autonomous driving controller 310, the processing circuitry 452 and the transceiver are configured to assign TDM bus time slots to the plurality of autonomous driving sensors and direct the plurality of autonomous driving sensors to transmit data in assigned time slots. The autonomous driving controller 310 receives first autonomous driving data from the plurality of autonomous driving sensors in assigned time slot(s), the first autonomous driving data transmitted at a first power level.

According to the present disclosure, the processing circuitry 452 also supports autonomous driving emergency operations 453 and the memory 454 stores computer instructions and data 455 to support the autonomous driving emergency operations. With these operations, the processing circuitry 452 and transceiver 461 detect an autonomous driving emergency message at a second power level that exceeds the first power level and receive the autonomous driving emergency message. Operation continues with the autonomous driving controller 310 taking additional actions, the operations of the autonomous driving controller described in more detail with reference to FIG. 11.

The processing circuitry 452 and the transceiver 461 are further configured to reassign TDM bus time slots to the plurality of autonomous driving sensors via communication on the TDM bus. Further, the processing circuitry 452 and the transceiver 461 are further configured to direct the plurality of autonomous driving sensors to transmit data in reassigned time slots.

The processing circuitry 452 and the transceiver 461 may be further configured to receive the autonomous driving emergency message on the TDM bus in a sub-time slot of a time slot and, based upon a location of the sub-time slot within the time slot, determine an identity of an autonomous driving sensor of the plurality of autonomous driving sensors.

Figure 5:
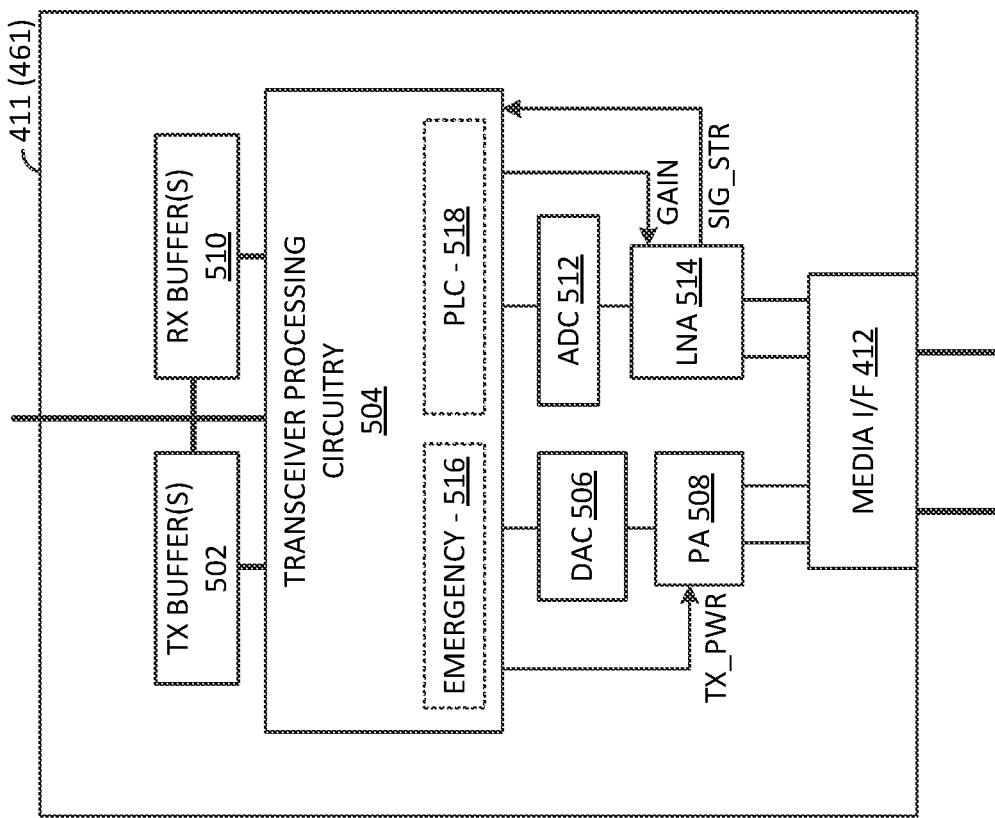
FIG. 5 is a block diagram illustrating a transceiver of an autonomous driving sensor (or autonomous driving controller) constructed according to a described embodiment.

FIG. 5 is a block diagram illustrating a transceiver of an autonomous driving sensor (or autonomous driving controller) constructed according to a described embodiment. The transceiver 411 (or 461) includes Transmit (TX) buffers 502, Receive (RX) buffers 510, and transceiver processing circuitry 504. The transceiver processing circuitry 504 supports autonomous driving emergency messaging operations 516 and PLC operations 518. TX path components further include a Digital to Analog Converter (DAC) 506 and a Power Amplifier (PA) that couple between the transceiver processing circuitry 504 and the media 1/F 412. RX path components include at least Low Noise Amplifier (LNA) 514 and an Analog to Digital Converter (ADC) that couple between the transceiver processing circuitry 504 and the media OF 412. Analog and digital filtering components, analog and digital gain stages, and other components may also be included in the RX path.

To support the transmission of the autonomous driving emergency operations, the transceiver processing circuitry 504 constructs the autonomous driving emergency message and provides the message to the DAC 506, which converts the message from a digital to analog format. Further, the transceiver processing circuitry 504 controls transmit power of the PA 508 to be greater than a normal transmit power, e.g., by 6 dB.

To support the detection of autonomous driving emergency operations of other autonomous driving sensors, the transceiver processing circuitry 504 controls the gain of the LNA 514 consistent with the power level of a received signal. For example, when another autonomous driving sensor transmits an autonomous driving emergency message at an increased power level, the gain of the LNA 514 is reduced to provide full signal range to the ADC 512, which converts the incoming signal from an analog format to a digital format. The incoming autonomous driving emergency message is then decoded by the transceiver processing circuitry 504.

Figure 6:
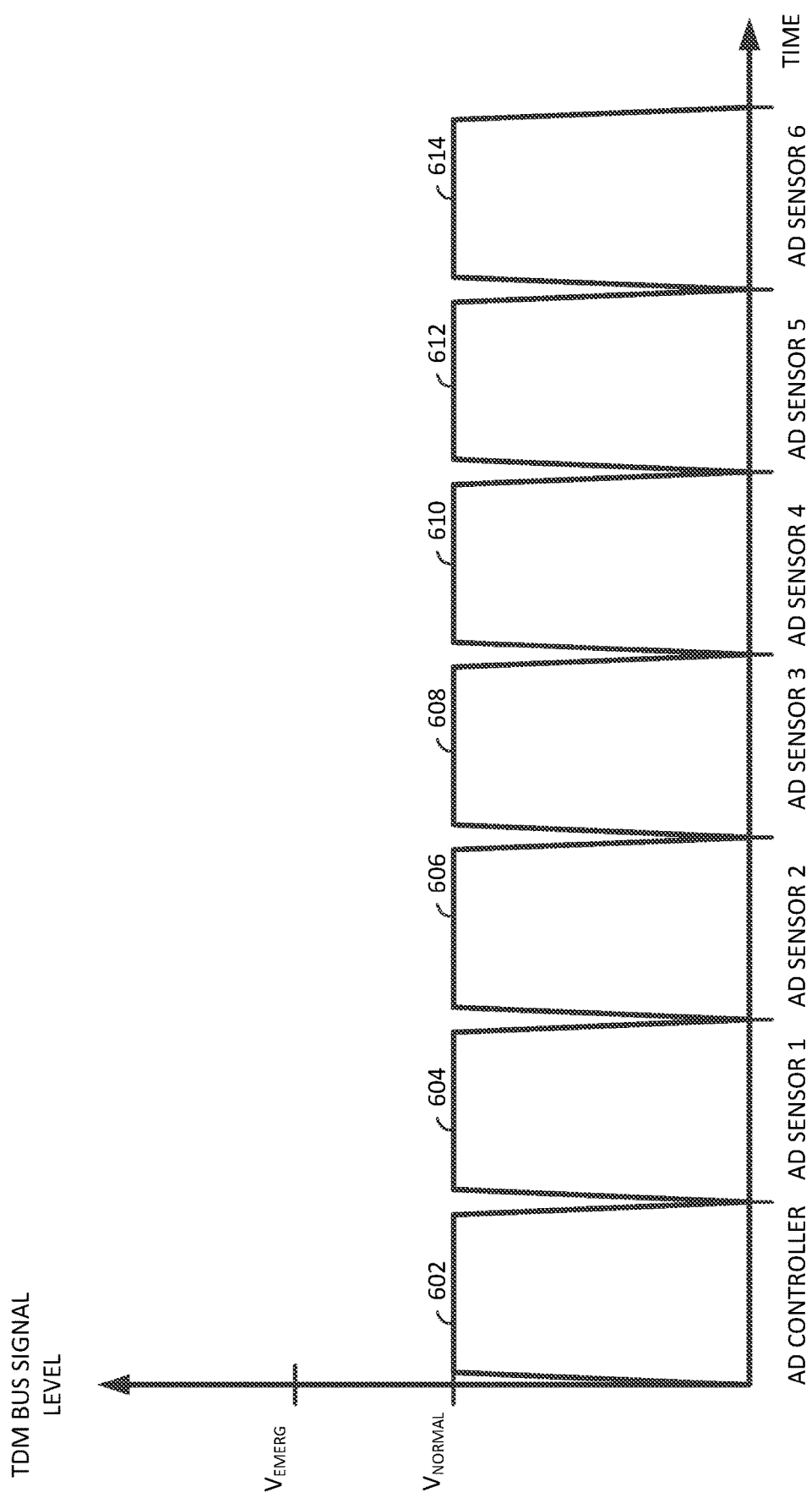
FIG. 6 is a graph illustrating Time Division Multiplex (TDM) bus slot assignments and signal levels during normal operations according to a described embodiment.

FIG. 6 is a graph illustrating Time Division Multiplex (TDM) bus slot assignments and signal levels during normal operations according to a described embodiment. Each of the autonomous driving controller 310 and six (6) autonomous driving sensors are assigned time slots. The TDM bus time slot assignment of FIG. 6 is an example only and differing assignments may include additional or fewer autonomous driving TDM bus time slot assignments. The autonomous driving sensors 312 and the autonomous driving controller 310 are each illustrated to be transmitting in their assigned time slots in FIG. 6. In particular, the autonomous driving controller 310 transmits signal 602 in its assigned time slot, a first autonomous driving sensor transmits signal 604 in its assigned time slot, a second autonomous driving sensor transmits signal 606 in its assigned time slot, a third autonomous driving sensor transmits signal 608 in its assigned time slot, a fourth autonomous driving sensor transmits signal 610 in its assigned time slot, a fifth autonomous driving sensor transmits signal 612 in its assigned time slot, and a sixth autonomous driving sensor transmits signal 614 in its assigned time slot.

The signal level of each of transmissions 602-614 on the TDM bus is shown to be approximately equal to signal level $V_{NORMAL}$, which is chosen to support normal communications on the TDM bus. Note that this signal level is less than a signal level denoted as $V_{EMERG}$. These signal levels may vary over time and at specific locations on the TDM bus due to attenuation. Generally, it is desirable for each of the devices coupled to the TDM bus to transmit with an approximately equal power level. However, the signal levels may be altered depending upon a noise level on the TDM bus, a location of the transmitting device on the TDM bus, and other factors. Examples of these differing power level transmissions will be disclosed in more detail with reference to FIG. 9D.

Further, these concepts may be extended such that the emergency message power level has multiple different emergency message power levels, each of the multiple different emergency message power levels indicating a different type of emergency, e.g., collision event detected, bad sensor detected, bad communication link detected, etc. Based upon the relative power levels of the detected emergency message, a determination may initially be made as to the type of emergency. Based upon this initial determination, operation of the autonomous driving system may be altered accordingly. An example of these differing emergency power levels is disclosed with reference to FIG. 9E.

Figure 7:
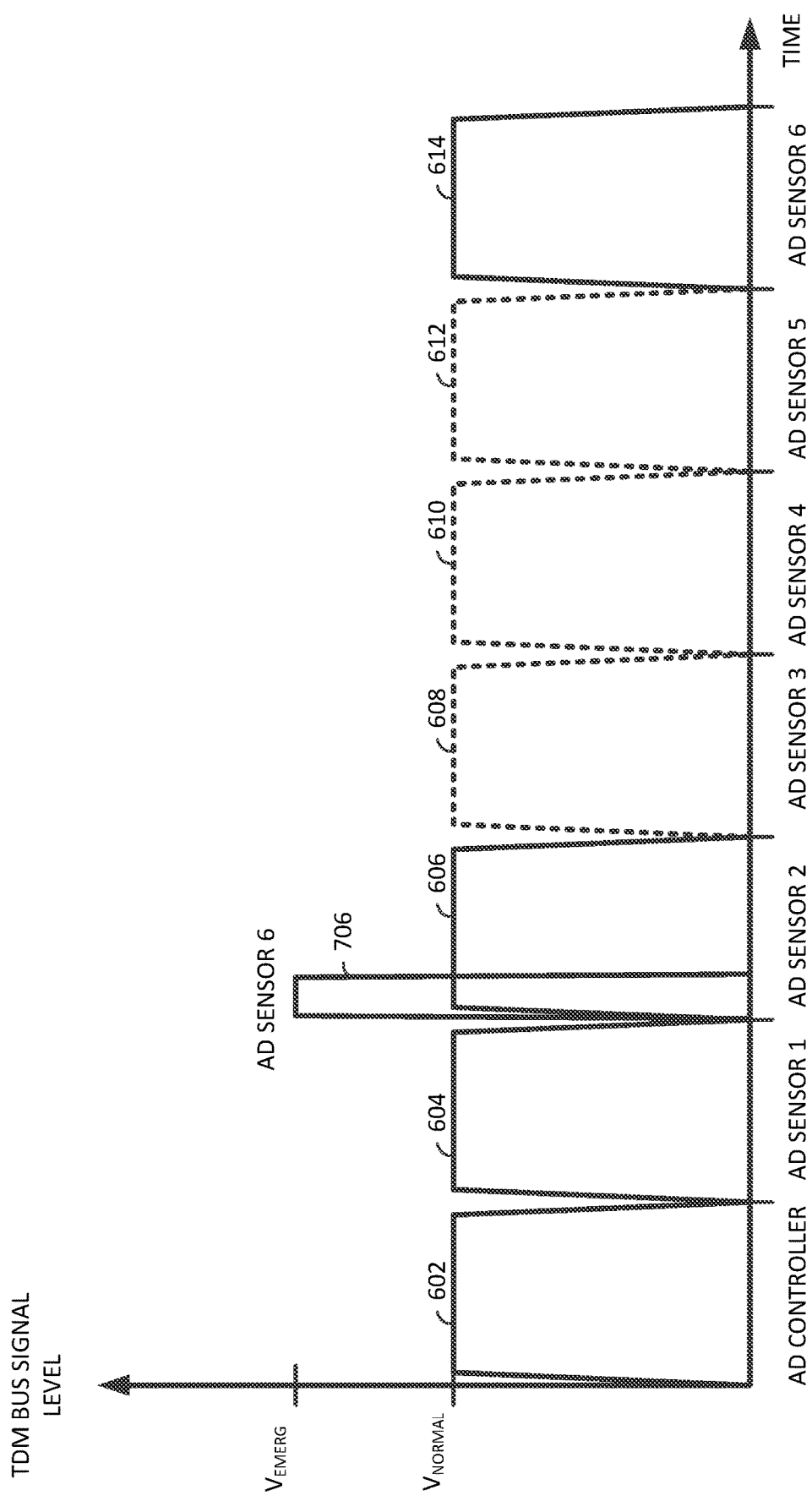
FIG. 7 is a graph illustrating TDM bus time slot assignments and signal levels during autonomous driving emergency operations according to a first described embodiment.

FIG. 7 is a graph illustrating TDM bus time slot assignments and signal levels during autonomous driving emergency operations according to a first described embodiment. Numbering shared with FIG. 6 is consistent. In the example of FIG. 7, autonomous driving sensor 6 detects an autonomous driving emergency event and transmits an autonomous driving emergency message 706 on the TDM bus in a non-assigned time slot (assigned to autonomous driving sensor 2). The autonomous driving emergency message 706 has a signal level of $V_{EMERG}$, which exceeds the signal level of $V_{NORMAL}$ of the signal 606 transmitted by autonomous driving sensor 2 by approximately 6 dB. Note that autonomous driving sensor 3, autonomous driving sensor 4, and autonomous driving sensor 5 do not transmit in their assigned time slots after detecting the autonomous driving emergency message.

Figure 8:
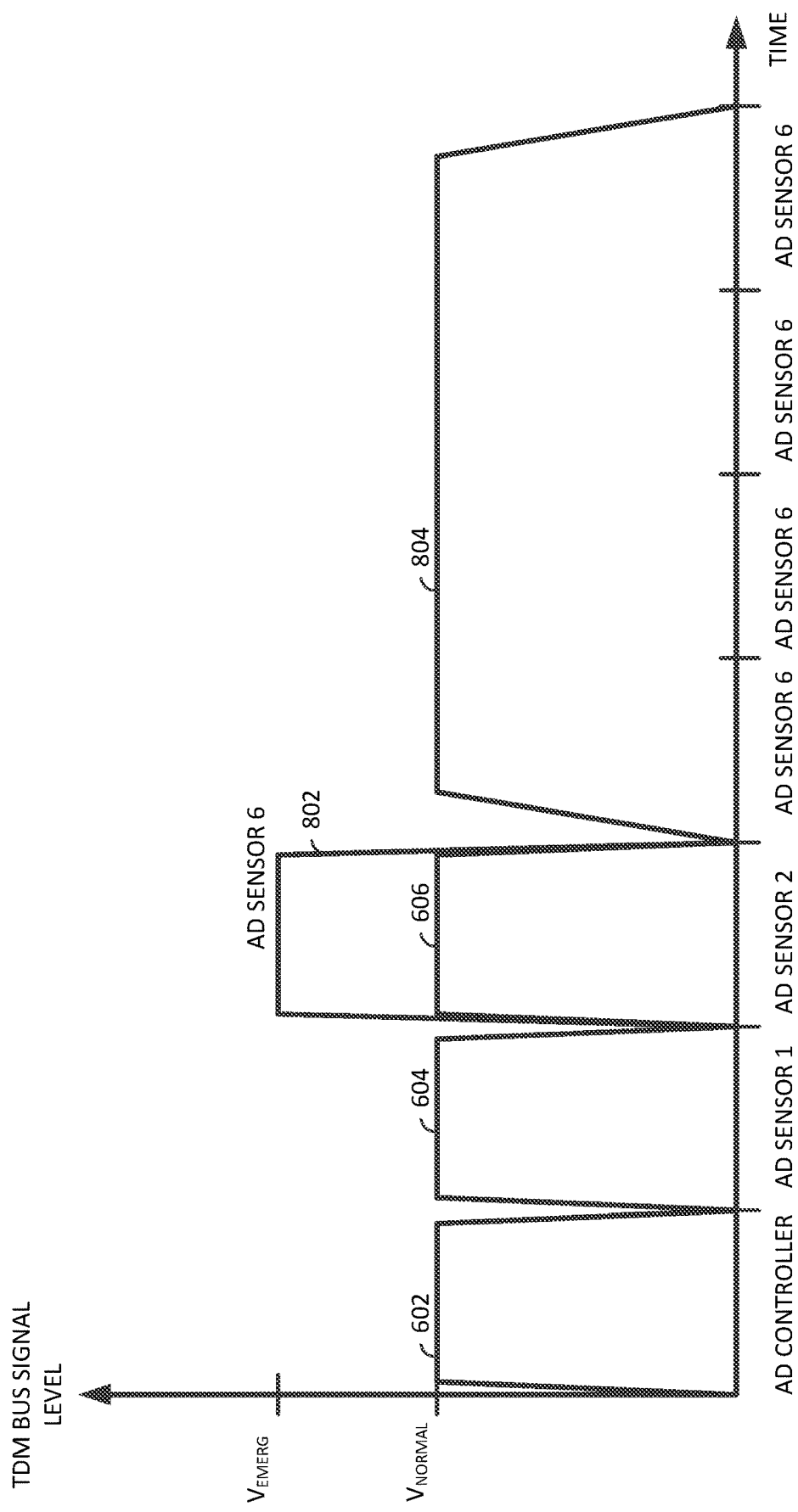
FIG. 8 is a graph illustrating TDM bus time slot assignments and signal levels during autonomous driving emergency operations according to a second described embodiment.

FIG. 8 is a graph illustrating TDM bus time slot assignments and signal levels during autonomous driving emergency operations according to a second described embodiment. Numbering shared with FIGS. 6 and 7 remains consistent. In the example of FIG. 8, autonomous driving sensor 6 detects an autonomous driving emergency event and transmits an autonomous driving emergency message 802 on the TDM bus in a non-assigned time slot (that is assigned to autonomous driving sensor 2). Note that the autonomous driving emergency message 802 of FIG. 8 has a longer duration than does the autonomous driving emergency message 706 of FIG. 7. The autonomous driving emergency message 802 has a signal level of $V_{EMERG}$, which exceeds the signal level of $V_{NORMAL}$ of the signal 606 transmitted by autonomous driving sensor 2 by approximately 6 dB. According to predetermined operations, immediately after transmission of the autonomous driving emergency message 802, autonomous driving sensor 6 has access to the TDM bus for four reassigned time slots to transmit autonomous driving data 804 to the autonomous driving controller. In another variation, the autonomous driving sensor 6 may only be assigned a single time slot that follows the assigned time slot of autonomous driving sensor 2. In still another aspect of these operations, an autonomous driving sensor may obtain control of the TDM bus for an extended period of time, e.g., a long enough duration to transmit all necessary data or until released by the autonomous driving sensor.

Figure 9A:
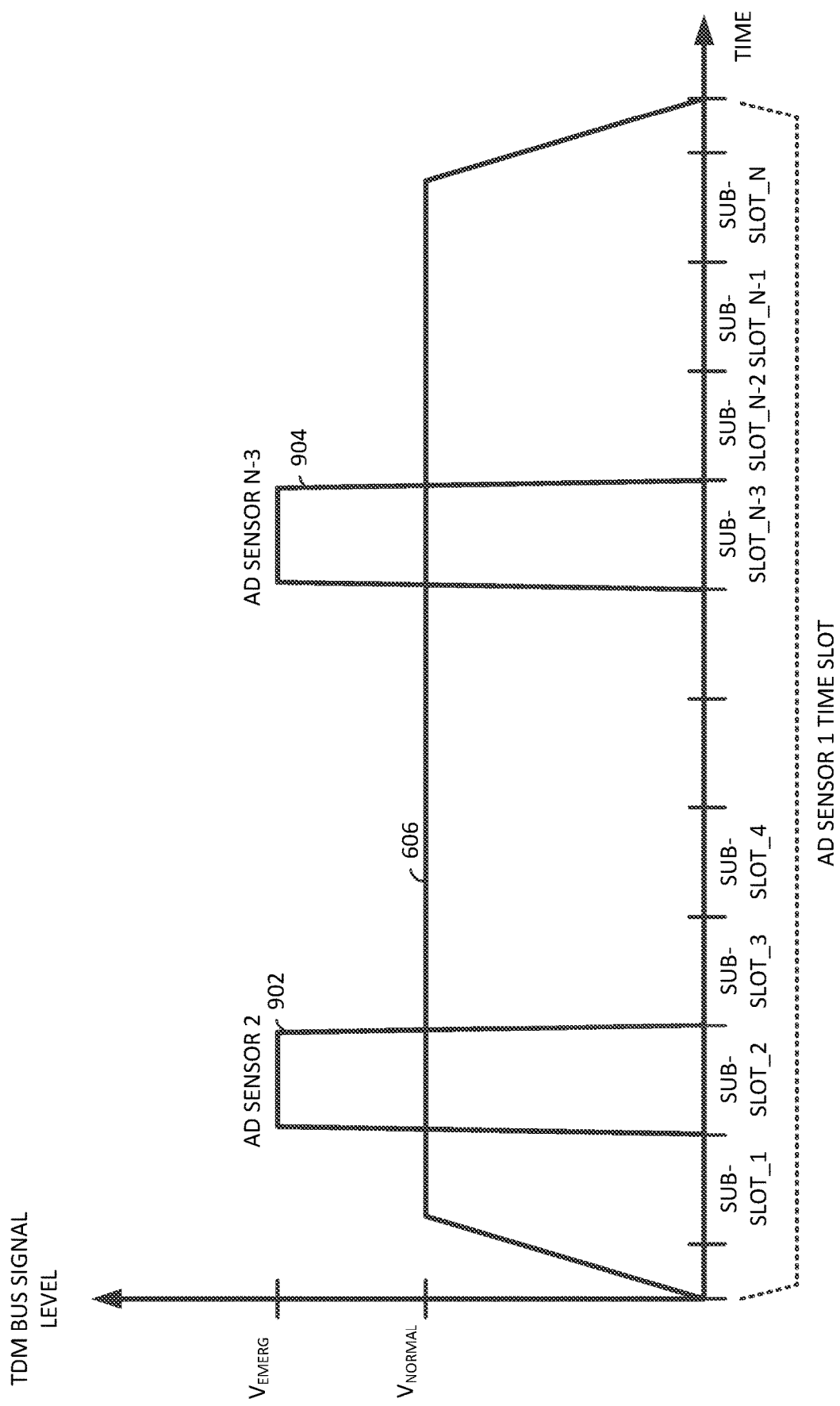
FIG. 9A is a graph illustrating TDM bus sub-slot assignments and signal levels during autonomous driving emergency operations according to a third described embodiment.

FIG. 9A is a graph illustrating TDM bus sub-slot assignments and signal levels during autonomous driving emergency operations according to a third described embodiment. Numbering shared with FIGS. 6-8 remains consistent. With the embodiment of FIG. 9A, each time slot is subdivided into a plurality of sub-time slots, e.g., N sub-time slots corresponding to N autonomous driving sensors. Thus, the autonomous driving sensor 1 time slot also has a sub-division thereof of N sub-time slots, each of which is associated with a respective autonomous driving sensor. With the signaling of FIG. 9A, both autonomous driving sensor 2 and autonomous driving sensor N–3 detect an autonomous driving emergency event. In response thereto, autonomous driving sensor 2 transmits an autonomous driving emergency message 902 in sub-slot_2 and autonomous driving sensor N–3 transmits an autonomous driving emergency message 904 in sub-slot_N–3, both at a signal level of $V_{EMERG}$, which exceeds the $V_{NORMAL}$ level of the transmission 606 of autonomous driving sensor 1. Based upon the relative position of these autonomous driving emergency messages 902 and 904 within the respective sub-time slots, the autonomous driving controller and, optionally, the other autonomous driving sensors may identify the autonomous driving sensors that have detected an autonomous driving emergency event.

Figure 9B:
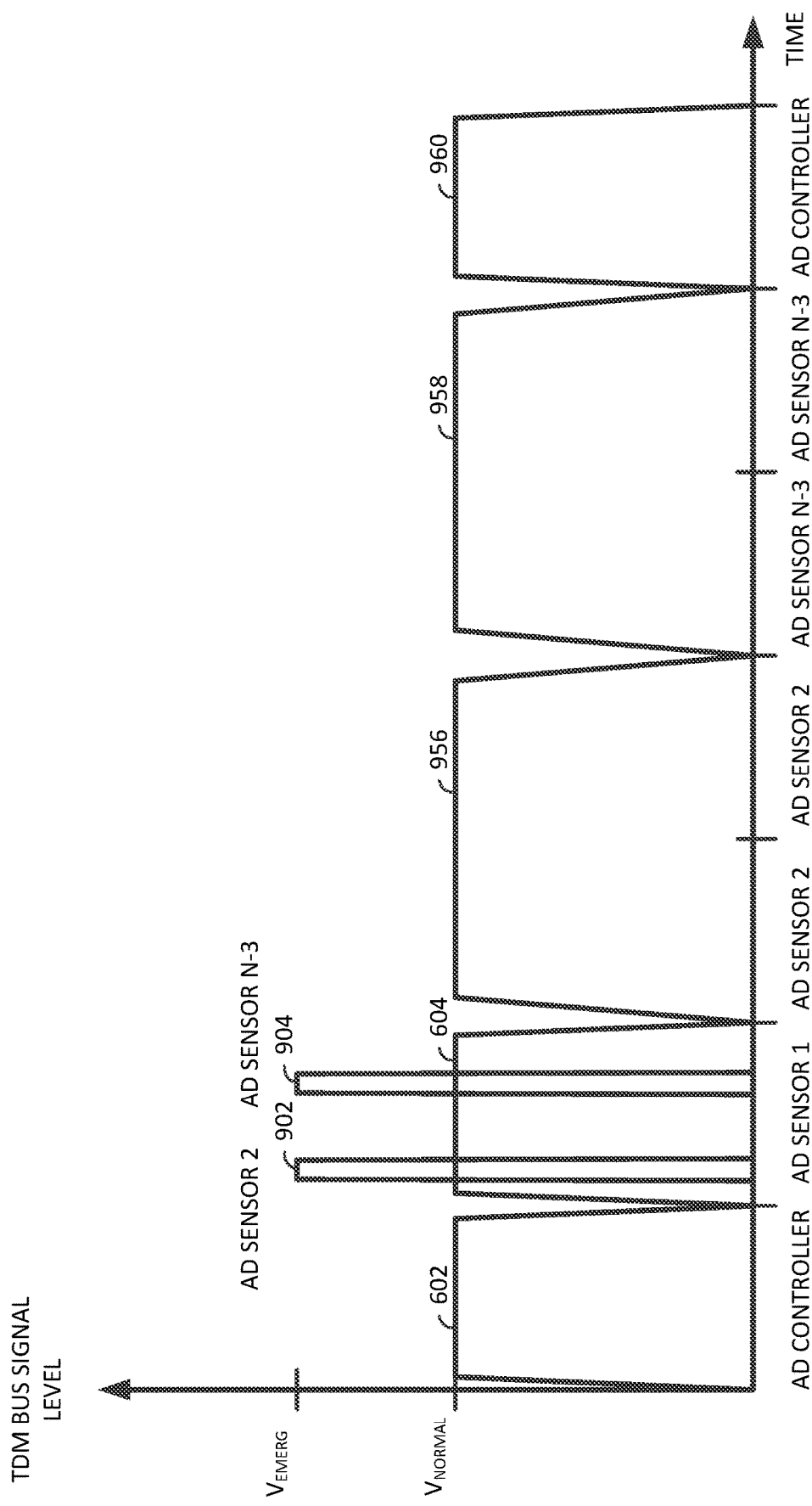
FIG. 9B is a graph illustrating TDM bus time slot assignments and signal levels during autonomous driving emergency operations consistent with the embodiment of FIG. 9A.

FIG. 9B is a graph illustrating TDM bus time slot assignments and signal levels during autonomous driving emergency operations consistent with the embodiment of FIG. 9A. Numbering shared with FIGS. 6-9A remains consistent. With the embodiment of FIG. 9B, autonomous driving sensor 2 transmits an autonomous driving emergency message 902 in sub-slot_2 and autonomous driving sensor N–3 transmits an autonomous driving emergency message 904 in sub-slot_N–3 of the time slot that is assigned to autonomous driving sensor 1. Based upon the relative position of these autonomous driving emergency messages 902 and 904 within the time slot, the autonomous driving controller and, optionally, the other autonomous driving sensors identify the autonomous driving sensors that have the detected autonomous driving emergency event. In response thereto, autonomous driving sensor 2 is assigned two time slots for additional transmissions 956 to the autonomous driving controller and autonomous driving sensor N–3 is assigned two time slots for additional transmissions 958 to the autonomous driving controller. The autonomous driving controller then transmits a message 960 in a subsequent time slot, which may be a message that reassigns time slots and/or directs the autonomous driving sensors in or more additional ways. These assignments are pre-determined according to established communication back off operations.

Figure 9C:
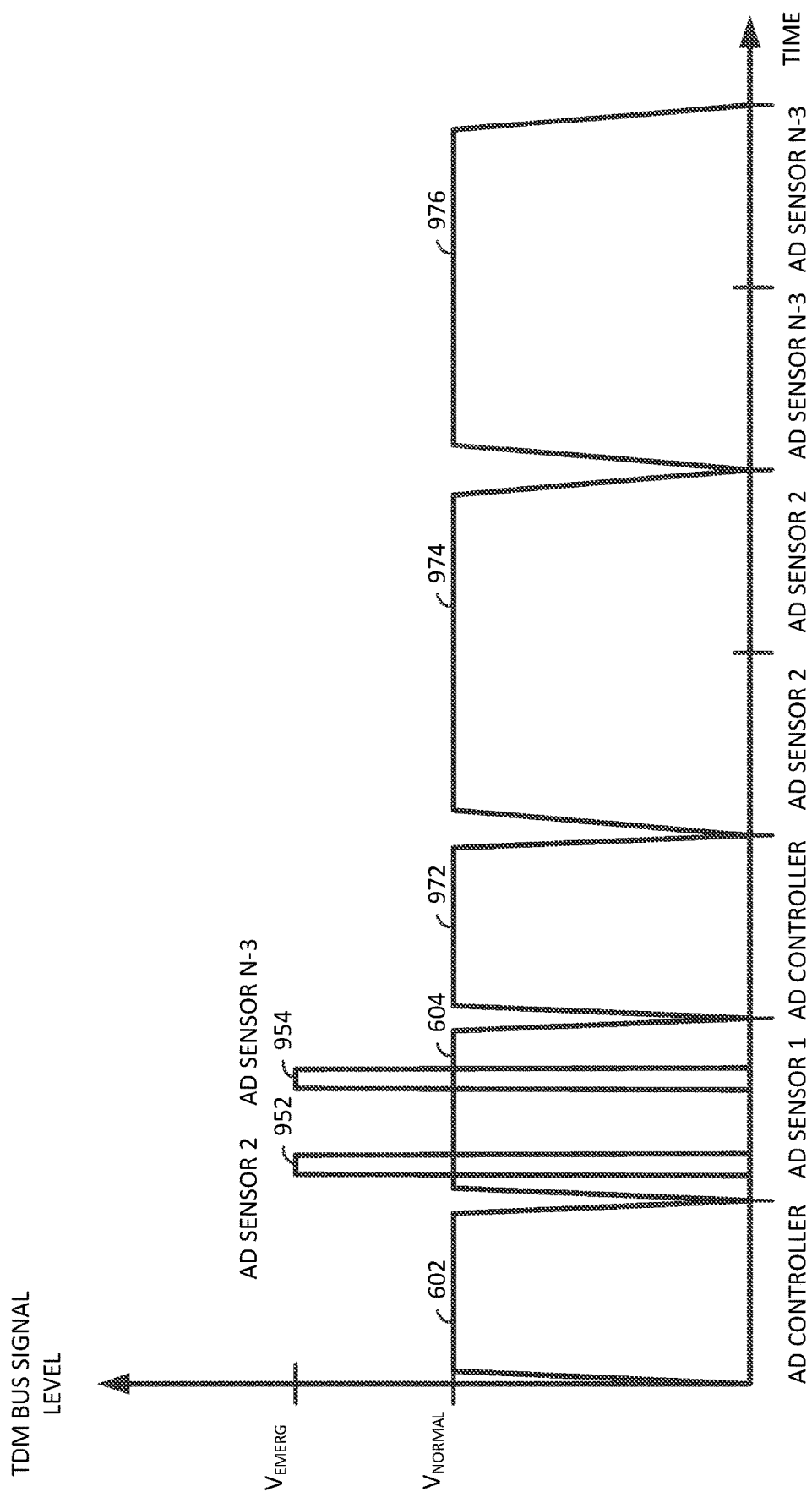
FIG. 9C is a graph illustrating TDM bus time slot assignments and signal levels during autonomous driving emergency operations consistent with the embodiment of FIG. 9A.

FIG. 9C is a graph illustrating TDM bus time slot assignments and signal levels during autonomous driving emergency operations consistent with the embodiment of FIG. 9A. Numbering shared with FIGS. 6-9A remains consistent. With the embodiment of FIG. 9C, autonomous driving sensor 2 transmits an autonomous driving emergency message 952 in sub-slot_2 and autonomous driving sensor N–3 transmits an autonomous driving emergency message 954 in sub-slot_N–3 of the time slot that is assigned to autonomous driving sensor 1. Based upon the relative position of these autonomous driving emergency messages 952 and 954 within the time slot, the autonomous driving controller and, optionally, the other autonomous driving sensors may identify the autonomous driving sensors that have detected the autonomous driving emergency event. In response thereto, the autonomous driving controller transmits new slot assignments 972 in the slot immediately following the slot in which the autonomous driving emergency messages were sent. Autonomous driving sensor 2 is assigned two time slots for additional transmissions 974 to the autonomous driving controller and autonomous driving sensor N–3 is assigned two time slots for additional transmissions 976 to the autonomous driving controller.

Figure 9D:
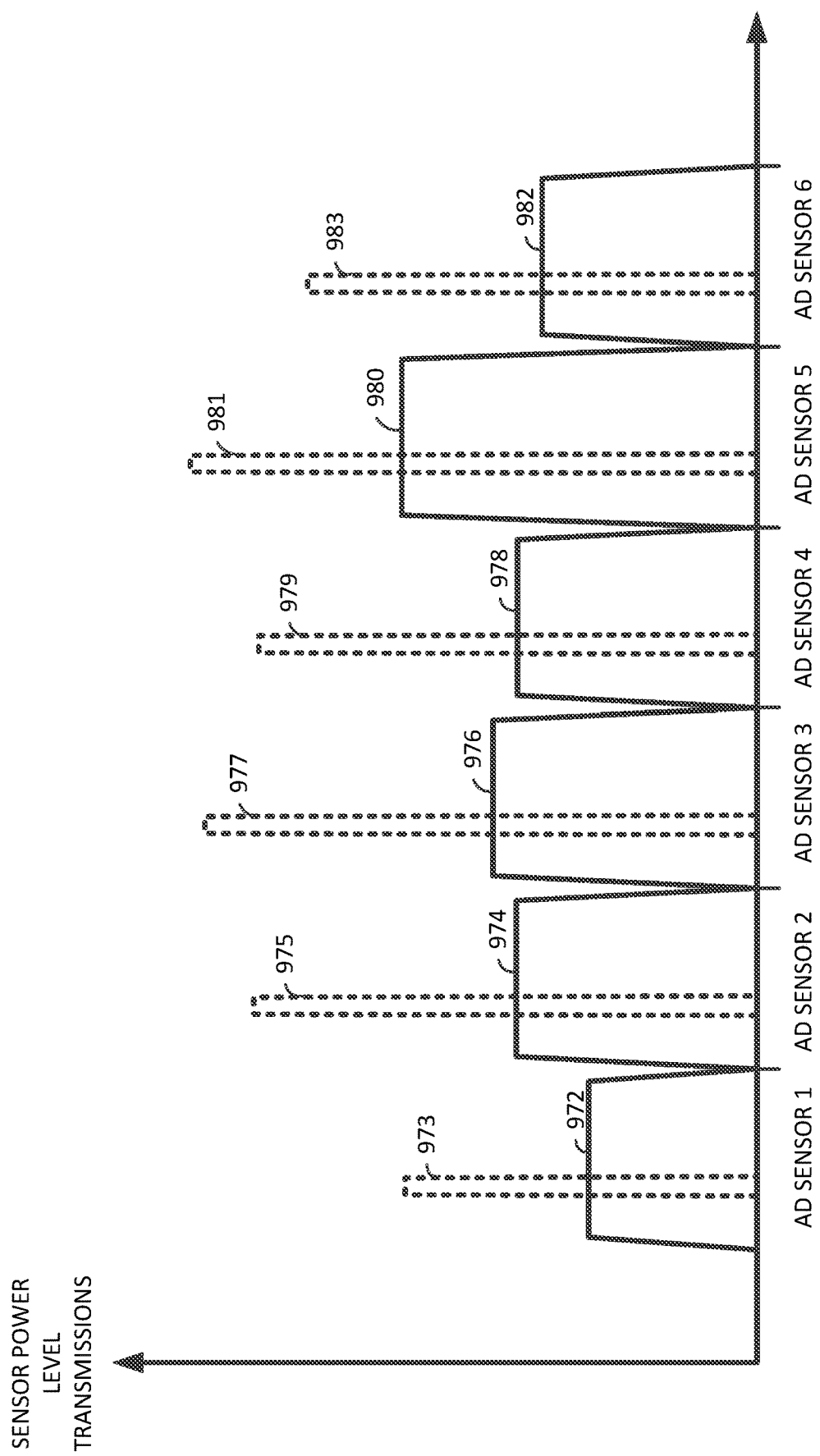
FIG. 9D is a graph illustrating TDM bus sensor power level transmissions by the plurality of autonomous driving sensors according to another aspect of the present disclosure.

FIG. 9D is a graph illustrating TDM bus sensor power level transmissions by the plurality of autonomous driving sensors according to another aspect of the present disclosure. As shown in FIG. 9D, each of autonomous driving sensors 1-6 may have differing local transmit power levels. These differing transmit power levels are dependent, for example, on the location of the respective autonomous driving sensors on the TDM bus, such differing power levels intended for transmissions to arrive at the autonomous driving controller 210 to arrive at approximately equal received power levels. For example, autonomous driving sensor 1 has a first transmit power level 972 and a second transmit power level 973 for emergency messages that exceeds the first power level 972. Note that autonomous driving sensors 2-6 have corresponding first transmit power levels 974, 976, 978, 980, and 982 and corresponding second transmit power levels 975, 977, 979, 981, and 983 of varying power levels.

Figure 9E:
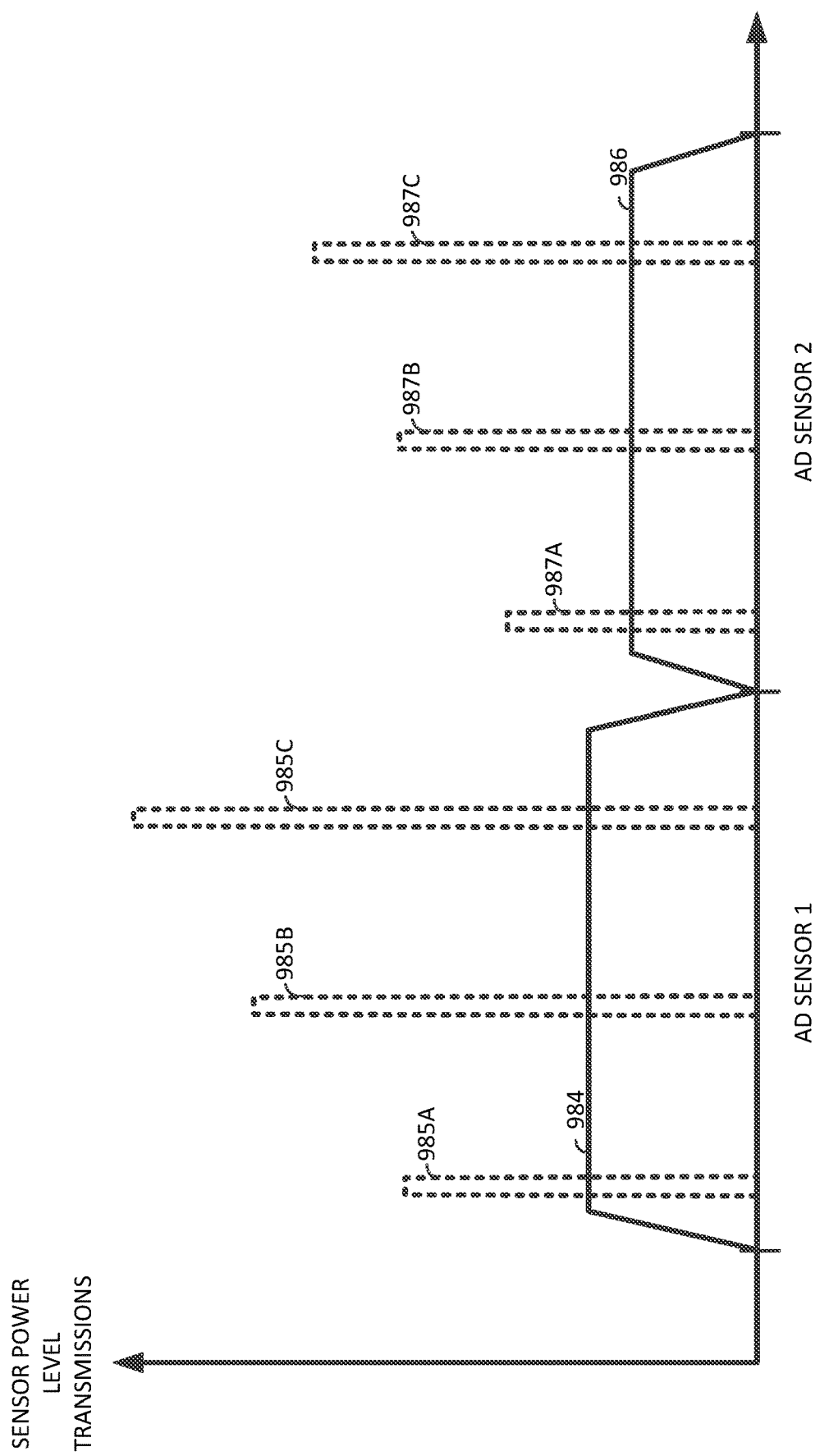
FIG. 9E is a graph illustrating TDM bus sensor power level transmissions by two autonomous driving sensors, detailing differing autonomous driving emergency message power levels according to another aspect of the present disclosure.

FIG. 9E is a graph illustrating TDM bus sensor power level transmissions by two autonomous driving sensors, detailing differing autonomous driving emergency message power levels according to another aspect of the present disclosure. As illustrated in FIG. 9E, autonomous driving sensor 1 has a first transmit power level 984 and three differing second transmit power levels 985A, 985B, and 985C, that exceed the first transmit power level 984 by a differing amount. Further, autonomous driving sensor 2 has a first transmit power level 986 and three differing second transmit power levels 987A, 987B, and 987C, that exceed the first transmit power level 984 by a differing amount. Based upon the relative difference of these second transmit power levels 985A-C and 987A-C, the autonomous driving sensor may indicate a type of emergency transmission, e.g., collision event detected, bad sensor detected, bad communication link detected, etc. Based upon the relative second power level of the detected emergency message, a determination may initially be made as to the type of emergency. Based upon this initial determination, operation of the autonomous driving system may be altered accordingly.

Figure 10:
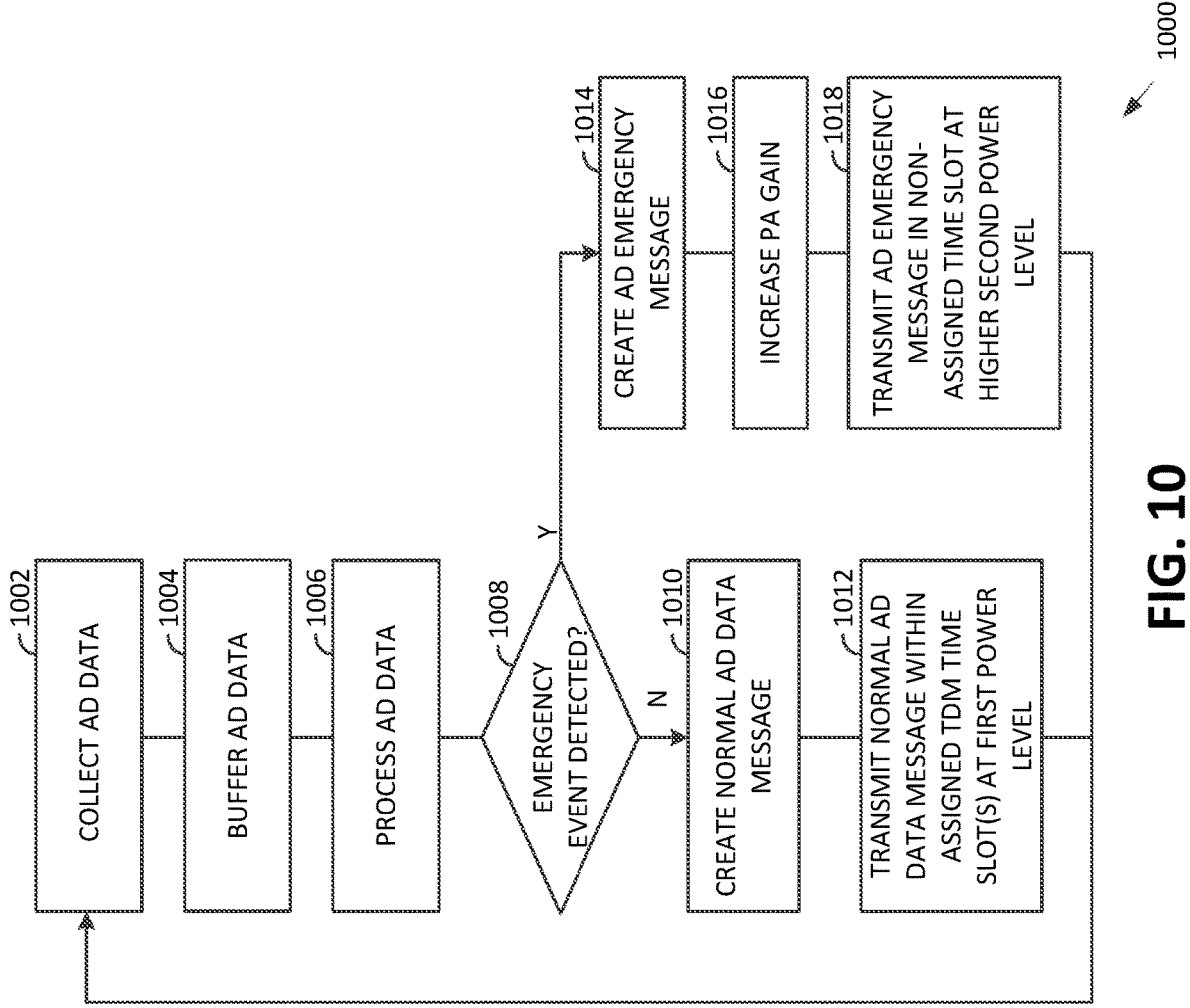
FIG. 10 is a flow diagram illustrating operation of an autonomous driving sensor according to one or more described embodiments.

FIG. 10 is a flow diagram illustrating operation of an autonomous driving sensor according to one or more described embodiments. The operations 1000 of FIG. 10 are consistent with the structures and operations previously described herein. Operations 1000 commence with the autonomous driving sensor collecting autonomous driving data (step 1002) and buffering the autonomous driving data (1004) in memory. The autonomous driving sensor then processes the autonomous driving data (step 1006). Based upon the processing, the autonomous driving sensor determines if an autonomous driving emergency event is detected (decision block 1008). If not, the autonomous driving sensor creates a normal autonomous driving data message (step 1010) and transmits the normal autonomous driving data message to the autonomous driving controller within one or more assigned time slots at a first power level (step 1012). From step 1012 operation returns to step 1002. Note that the autonomous driving sensor may continue to collect autonomous driving data while transmitting the normal autonomous driving data message.

If at decision block 1008 the autonomous driving sensor determines that an autonomous driving emergency event exists, the autonomous driving sensor creates an autonomous driving emergency message (step 1014), increases its gain (step 1016) and transmits the autonomous driving emergency message in a non-assigned time slot at a higher second power level (step 1018). The increase in gain may be accomplished by increasing the gain of a PA, increasing digital gain, increasing the gain of analog or digital filters, and/or other signal path components. From step 1018, operation returns to step 1002. The timing of transmission of the autonomous driving emergency message at step 1018 may be in a next non-assigned time slot or in a current non-assigned time slot. The autonomous driving emergency message may be transmitted in a particular sub-time slot (as illustrated in FIG. 9A). Note that if the current time slot is assigned, the autonomous driving sensor may still transmit the autonomous driving emergency message in its assigned time slot.

Figure 11:
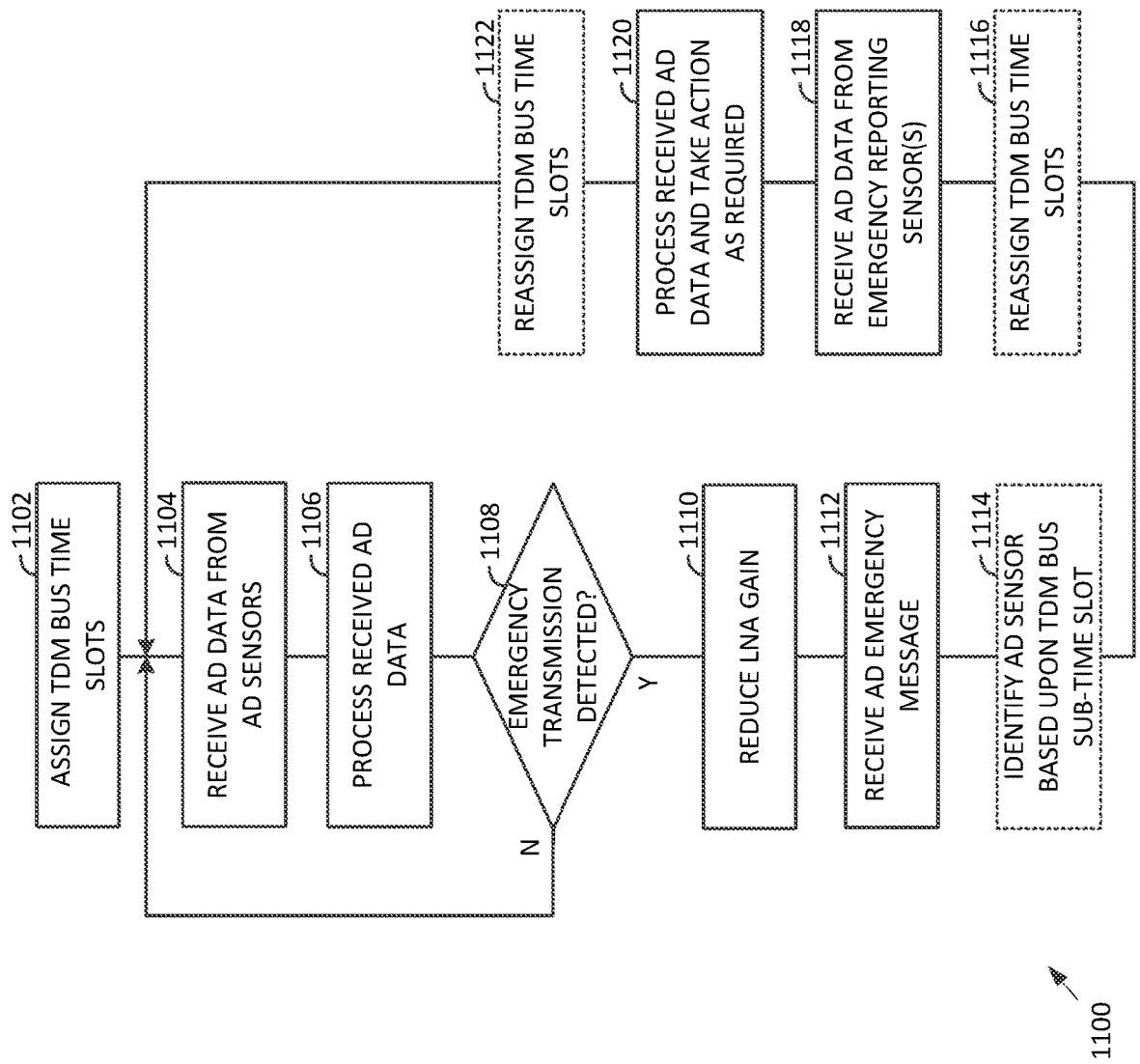
FIG. 11 is a flow diagram illustrating operation of an autonomous driving controller according to one or more described embodiments.

FIG. 11 is a flow diagram illustrating operation of an autonomous driving controller according to one or more described embodiments. The operations 1100 of FIG. 11 are consistent with the structures and operations previously described herein. Operations 1100 commence with the autonomous driving controller assigning time slots to a plurality of devices that use the TDM bus for communications, such plurality of devices including the plurality of autonomous driving sensors (step 1102). Operations continue with the autonomous driving controller receiving autonomous driving data from one or more autonomous driving sensors via the TDM bus (step 1104). The autonomous driving controller then processes the received autonomous driving data (step 1106). The autonomous driving controller continuously detects whether an autonomous driving emergency message is present on the TDM bus (step 1108). This detection operation is illustrated at decision step 1108 at a particular point in the operations 1100 but could be shown at differing points in the operations 1100.

If the autonomous driving controller does not detect an autonomous driving emergency transmission on the TDM bus at step 1108, operations return to step 1104. However, if the autonomous driving controller does detect an autonomous driving emergency transmission on the TDM bus at step 1108, the autonomous driving controller reduces the gain of one or more components in the receive path (step 1110). The autonomous driving controller then receives the autonomous driving emergency message (step 1112), optionally identifying an autonomous driving sensor based upon a sub-time slot that the autonomous driving emergency message occupies (step 1114). The autonomous driving controller then optionally reassigns TDM bus time slots (step 1116) via signaling to the devices coupled to the TDM bus or via a pre-established operational protocol. The autonomous driving controller then receives autonomous driving data from one or more emergency reporting sensors (step 1118), processes the autonomous driving data, and takes action as required (step 1120). The autonomous driving controller then optionally reassigns TDM bus time slots (step 1122). From step 1122 operation returns to step 1104.

Figure 12:
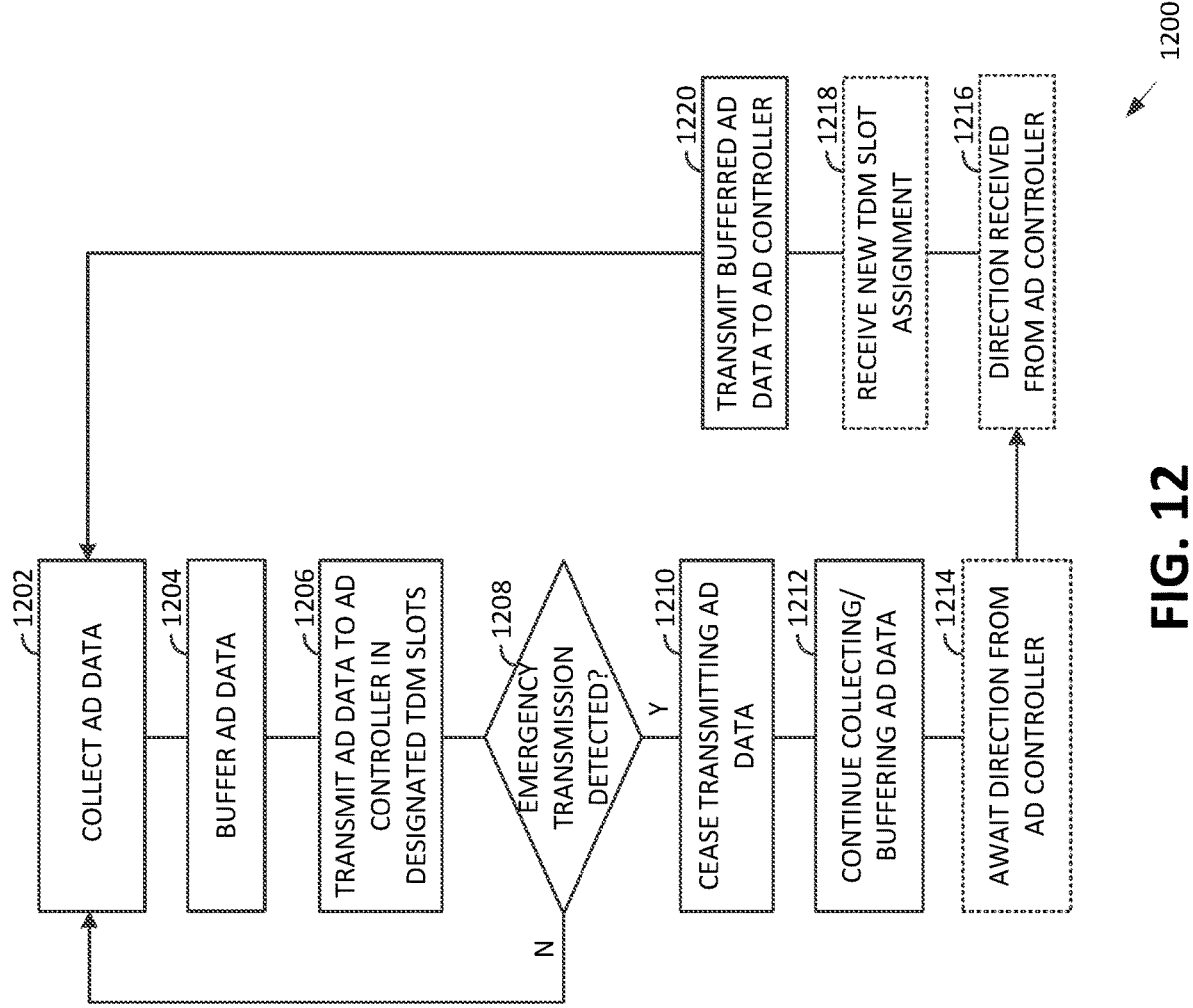
FIG. 12 is a flow diagram illustrating operation of another autonomous driving sensor according to one or more described embodiments.

FIG. 12 is a flow diagram illustrating operation of another autonomous driving sensor according to one or more described embodiments. When not transmitting on the TDM bus, autonomous driving sensors may monitor traffic on the TDM bus. Thus, with the operations 1200 of FIG. 12, even while collecting autonomous driving data (step 1202), buffering the autonomous driving data (step 1204), and/or transmitting the autonomous driving data to the autonomous driving controller in one or more designated time slots (step 1206), the autonomous driving sensor monitors the TDM bus in an attempt to detect an emergency transmission (step 1208). If no emergency transmissions are detected, operations continue with steps 1202, 1204, and 1206.

However, if an emergency transmission is detected at step 1208, the autonomous driving sensor ceases transmitting autonomous driving data (step 1210). Such cessation may continue for one assigned time slot, for more than one assigned slots, and/or until the autonomous driving sensor receives direction from the autonomous driving controller to continue transmitting autonomous driving data or receives a new TDM bus time slot assignment from the autonomous driving controller. During this time period in which the autonomous driving sensor is no longer transmitting autonomous driving data on the TDM bus, the autonomous driving sensor continues to collect and buffer autonomous driving data (step 1212). The autonomous driving sensor then optionally awaits direction from the autonomous driving controller (step 1214). Once direction is optionally received from the autonomous driving controller (step 1216) and/or the autonomous driving sensor optionally receives a new slot assignment from the autonomous driving controller (step 1218), the autonomous driving sensor transmits buffered autonomous driving data to the autonomous driving controller (step 1220). From step 1220, operation returns to step 1202.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" or "processing circuitry" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the invention.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

What is claimed is:

1. A method comprising:
receiving, by a processor, first autonomous driving data from at least one autonomous driving sensor of a plurality of autonomous driving sensors in communication with an autonomous vehicle;
transmitting, by the processor, data in assigned time slots at a first power level to a second processor associated with the autonomous vehicle;
detecting, by the processor, an autonomous driving emergency event associated with the autonomous vehicle; and
transmitting, by the processor, an autonomous driving emergency message to the second processor at a second power level that exceeds the first power level.

2. The method of claim 1, wherein the second processor is in communication with a time division multiplexed (TDM) bus.

3. The method of claim 1, wherein the second power level is 6 dB greater than the first power level.

4. The method of claim 1, further comprising:
reassigning, by the processor, one or more time slots to the plurality of autonomous driving sensors.

5. The method of claim 4, further comprising:
directing, by the processor, the plurality of autonomous driving sensors to transmit data in reassigned time slots.

6. The method of claim 1, wherein the collected autonomous driving data is transmitted using a first modulation and the autonomous driving emergency message is transmitted using a second modulation that differs from the first modulation.

7. An autonomous vehicle comprising:
a plurality of autonomous driving sensors configured to collect autonomous driving data; and
a processor in communication with the plurality of autonomous driving sensors, the processor configured to:
receive first autonomous driving data from at least one autonomous driving sensor of the plurality of autonomous driving sensors of the autonomous vehicle;
transmit data in assigned time slots at a first power level to a second processor associated with the autonomous vehicle;
detect an autonomous driving emergency event associated with the autonomous vehicle; and
transmit an autonomous driving emergency message to the second processor at a second power level that exceeds the first power level.

8. The autonomous vehicle of claim 7, wherein the second processor is in communication with a time division multiplexed (TDM) bus.

9. The autonomous vehicle of claim 7, wherein the second power level is 6 dB greater than the first power level.

10. The autonomous vehicle of claim 7, wherein the processor is further configured to:
assign one or more time slots to the plurality of autonomous driving sensors.

11. The autonomous vehicle of claim 10, wherein the processor is further configured to:
direct the plurality of autonomous driving sensors to transmit data in assigned time slots.

12. The autonomous vehicle of claim 7, wherein the collected autonomous driving data is transmitted using a first modulation and the autonomous driving emergency message is transmitted using a second modulation that differs from the first modulation.

13. A non-transitory computer-readable medium having a set of instructions, that when executed, cause a processor to:
receive first autonomous driving data from at least one autonomous driving sensor of a plurality of autonomous driving sensors in communication with an autonomous vehicle;
transmit data in assigned time slots at a first power level to a second processor associated with the autonomous vehicle;
detect an autonomous driving emergency event associated with the autonomous vehicle; and
transmit an autonomous driving emergency message to the second processor at a second power level that exceeds the first power level.

14. The non-transitory computer-readable medium of claim 13, wherein the second processor is in communication with a time division multiplexed (TDM) bus.

15. The non-transitory computer-readable medium of claim 13, wherein the second power level is 6 dB greater than the first power level.

16. The non-transitory computer-readable medium of claim 13, wherein the processor is further configured to:
assign one or more time slots to the plurality of autonomous driving sensors.

17. The non-transitory computer-readable medium of claim 16, wherein the processor is further configured to:
direct the plurality of autonomous driving sensors to transmit data in assigned time slots.

18. The non-transitory computer-readable medium of claim 13, wherein the collected autonomous driving data is transmitted using a first modulation and the autonomous driving emergency message is transmitted using a second modulation that differs from the first modulation.

* * * * *